United States Patent

Horstmann

Patent Number: 4,663,484
Date of Patent: May 5, 1987

[54] DIAMINOALKYLDIPHENYL ETHERS, A PROCESS FOR THEIR PREPARATION AND THEIR USE

[75] Inventor: Walter Horstmann, Bergisch-Gladbach, Fed. Rep. of Germany

[73] Assignee: Bayer Aktiengesellschaft, Leverkusen, Fed. Rep. of Germany

[21] Appl. No.: 801,527

[22] Filed: Nov. 25, 1985

[30] Foreign Application Priority Data

Dec. 14, 1984 [DE] Fed. Rep. of Germany ....... 3445644

[51] Int. Cl.$^4$ ........................................... C07C 147/13
[52] U.S. Cl. ................................................... 564/430
[58] Field of Search ...................................... 564/430

[56] References Cited

U.S. PATENT DOCUMENTS 2,765,341 10/1956 Wirth et al. ...................... 564/430
3,228,982 1/1966 Washburn et al. ............. 564/430 X
4,179,461 12/1979 Marhold et al. ................ 564/430 X
4,370,501 1/1983 Lau ................................. 564/430 X Primary Examiner—Paul F. Shaver
Attorney, Agent, or Firm—Sprung, Horn, Kramer & Woods

[57] ABSTRACT

New diaminoalkyldiphenyl ethers of the formula

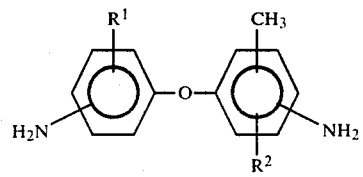

wherein
$R^1$ and $R^2$ are identical or different and denote hydrogen or methyl, but $R^1$ and $R^2$ do not simultaneously represent methyl, are prepared by a process wherein alkyldiphenyl ethers of the formula

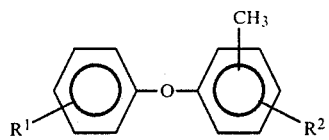

wherein
$R^1$ and $R^2$ have the above-mentioned meaning are acetylated, the diacetyl compounds obtained, in aqueous-alcoholic solution or suspension, are converted to the corresponding dioximes with hydroxylamine, the dried dioximes are subjected to a Beckmann rearrangement and thereafter the diacetylaminoalkyldiphenyl ethers formed are hydrolyzed by means of aqueous mineral acids or alkali metal hydroxide solutions to give the diamines.

The new diaminoalkyldiphenyl ethers are used in the preparation of dyestuffs and polyurethanes and serve as monomers for the preparation of polymers.

10 Claims, No Drawings

DIAMINOALKYLDIPHENYL ETHERS, A PROCESS FOR THEIR PREPARATION AND THEIR USE

BACKGROUND OF THE INVENTION

The invention relates to new diaminoalkyldiphenyl ethers, a process for their preparation and the use of the new diaminoalkyldiphenyl ethers.

SUMMARY OF THE INVENTION

The diaminoalkyldiphenyl ethers of the general formula

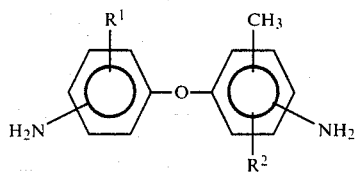

(I)

wherein
$R^1$ and $R^2$ are identical or different and denote hydrogen or methyl, but $R^1$ and $R^2$ do not simultaneously represent methyl
are new.

Preferred among the new diaminoalkyldiphenyl ethers are those of the general formula

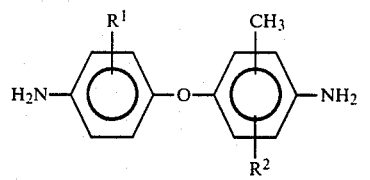

(II)

wherein
$R^1$ and $R^2$ are identical or different and denote hydrogen or methyl, but $R^1$ and $R^2$ do not simultaneously represent methyl.

Particularly preferred are the diaminoalkyldiphenyl ethers of the formula

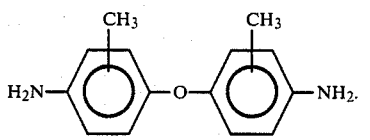

(III)

As new diaminoalkyldiphenyl ethers falling within the scope of the invention there may be mentioned: 4,4'-diamino-2-methyl-diphenyl ether, 4,4'-diamino-2,2'-dimethyl-diphenyl ether, 4,4'-diamino-3,3'-dimethyl-diphenyl ether, 4,4'-diamino-2,3'-dimethyl-diphenyl ether, 4,4'-diamino-2,6-dimethyl-diphenyl ether and 2,4'-diamino-4,2'-dimethyl-diphenyl ether, preferred compounds being 4,4'-diamino-2,2'-dimethyl-diphenyl ether, 4,4'-diamino-3,3'-dimethyl-diphenyl ether and 4,4'-diamino-2,6-dimethyl-diphenyl ether and a particularly preferred compound being 4,4'-diamino-2,2'-dimethyl-diphenyl ether.

The invention further relates to a process for the preparation of the new diaminoalkyldiphenyl ethers of the formula

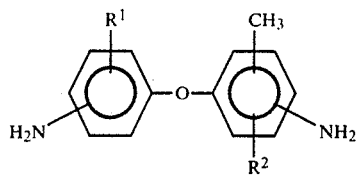

(I)

wherein
$R^1$ and $R^2$ are identical or different and denote hydrogen or methyl, but $R^1$ and $R^2$ do not simultaneously represent methyl,
which is characterised in that alkyldiphenyl ethers of the formula

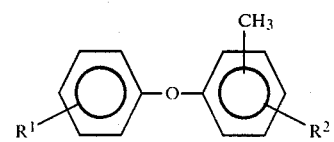

(IV)

wherein
$R^1$ and $R^2$ have the abovementioned meaning are acetylated, the diacetyl compounds obtained, in aqueous-alcoholic solution or suspension, are converted to the corresponding dioximes with hydroxylamine, the dried dioximes are subjected to a Beckmann rearrangement and thereafter the diacetylaminoalkyldiphenyl ethers formed are hydrolyzed by means of aqueous mineral acids or alkali metal hydroxide solutions to give the diamines.

DETAILED DESCRIPTION OF THE INVENTION

The process according to the invention may be explained with the aid of the following equation:

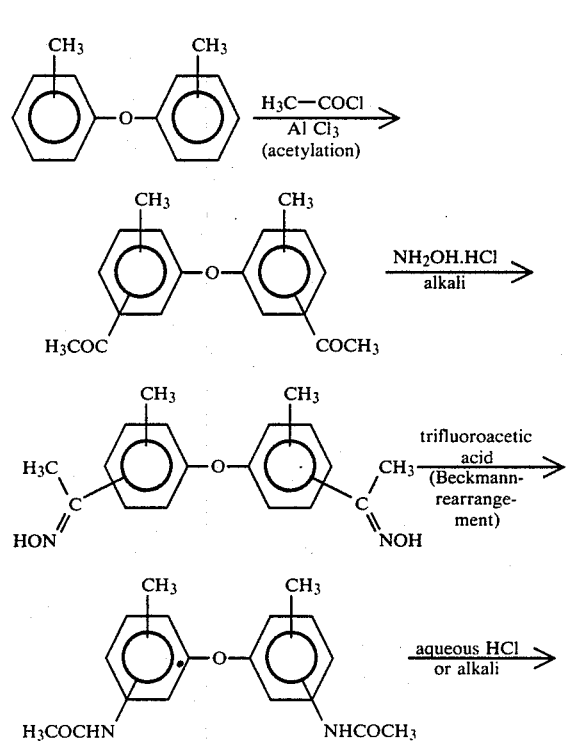

-continued

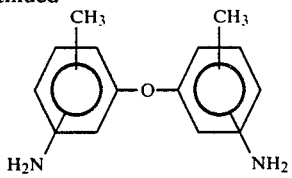

The monoalkyl- or dialkyl-diphenyl ethers of the general formula (IV), employed as starting materials, can be prepared by reacting alkylphenols with alkylhalobenzenes using a copper catalyst. For example, o-chlorotoluene and o-cresol, with copper-(I) oxide as a catalyst, gives a very good yield of di-o-tolyl ether. Isomer mixtures of ditolyl ethers are obtained as by-products in the industrial synthesis of cresol from chlorotoluene mixtures (compare *Industrial and Engineering Chemistry*, Vol. 38, 254 (1946)). The isomer mixtures of ditolyl ethers can, after separation into the pure isomers by distillation, be employed in the process according to the invention. Furthermore it is possible to use certain isomer mixtures, for example a mixture of 25% by weight of 2,2'-, 25% by weight of 3,3'- and 50% by weight of 2,3'-ditolyl ether directly in the process according to the invention.

The following alkyl-diphenyl ethers may, for example, be employed in the process according to the invention: 2-methyl-diphenyl ether, 3-methyldiphenyl ether, 2,2'-, 2,3'-, 3,3'- and 2,4'-ditolyl ether, 2,5- and 2,6-dimethyl-diphenyl ether.

The acetylation of the alkyl-diphenyl ethers is carried out in the conventional manner by the Friedel-Crafts method (cf. Houben-Weyl, Methoden der org. Chemie, Volume VIII/2a, page 15 et seq.), using approximately two-fold molar amounts (preferably 2.1 to 2.2 moles per mole of alkyldiphenyl ether) of acetyl chloride in an organic solvent, such as methylene chloride, dichloroethane and/or tetrachloroethane, in the presence of anhydrous aluminium chloride in the temperature range from about 0° to 50° C., preferably 20° to 30° C. The yields from this reaction are virtually quantitative and the quality of the diacetyl compound is such that it can be directly converted further to the dioximes.

To introduce the oximino group, the procedure generally followed (compare *Houben-Weyl, Methoden der organischen Chemie*, Volume X/4, pages 55 et seq.) is that the diacetyl compound is reacted, in aqueous methanol and/or ethanol, with excess hydroxylammonium chloride and/or sulphate at temperatures from about 60° to 90° C., preferably 70° to 80° C., and the hydrochloric acid and/or sulphuric acid liberated is bonded by adding alkali metal hydroxide solution. Solid dioximes are isolated by filtration after acidification with a mineral acid, while liquid dioximes are isolated by extraction with a suitable solvent, such as ether, toluene or chlorobenzene, and evaporation of the solvent.

The Beckmann rearrangement of the dioximes obtained leads to the corresponding diacetamino-alkyldiphenyl ethers (compare *Organic Reactions*, Vol. 11, 55 et seq.). For this it is possible, for example to heat the dry dioxime, in concentrated sulphuric acid, to temperatures of about 90° to 110° C., preferably 100° to 110° C., or to allow a solution of the dioxime in trifluoroacetic acid to run into boiling trifluoroacetic acid at temperatures of about 70° to 80° C., or to introduce hydrogen chloride gas into a solution of the dioxime in mixtures of acetic acid and acetic anhydride at temperatures of about 60° to 120° C., preferably 70° to 80° C. For working up, the mixture is poured out onto water and the diacetamino compounds, which as a rule are solid, are isolated. The yields of this rearrangement reaction are about 80 to 90% of theory.

The diaminoalkyldiphenyl ethers according to the invention are obtained by hydrolyzing the diacetamino compounds, for example by heating them with about 20 to 25% strength aqueous hydrochloric acid at temperatures of about 80° to 100° C., preferably 90° to 95° C., and after conclusion of the reaction rendering the mixture alkaline, or treating the diacetamino compounds with an about 20 to 30% strength solution of potassium hydroxide in aqueous methanol under pressure (about 3 to 5 bar) at temperatures of about 100° to 140° C., preferably 110° to 120° C., isolating the solid or liquid diamines which have separated out and purifying them by crystallization or distillation.

The method of preparation described is outstandingly suitable for the industrial preparation of the new diamino-alkyldiphenyl ethers claimed, which are used for the preparation of dyestuffs and polyurethanes and as monomers for the synthesis of polymers.

The diamines described are unobtainable, or only obtainable at great expense, by other processes. For example, the nitration of alkyldiphenyl ethers with nitric acid does not yield, alongside oxidation products, any defined dinitro compounds which might be reduced to the diamines according to the invention (nitration in the presence of sulphuric acid is ruled out because sulphonation of the alkyldiphenyl ethers occurs at the same time). The reaction of halonitroalkylbenzenes having an activated halogen atom (the nitro group being in the ortho- or para-position) with nitroalkylphenols admittedly leads to the defined dinitro-alkyldiphenyl ethers (compare Japanese Pat. No. 51-1436 (1976)) which can be reduced to the diamines described, but an economical preparation is prevented by the difficulty of obtaining the starting materials.

The use of the new diamines for the preparation of dyestuffs is based on, for example, tetrazotizing them and then reacting with suitable coupling components, such as N-benzoyl-H acid or N-acetyl-I acid, to give water-soluble dyestuffs. Yellow, water-insoluble pigment dyestuffs are obtained, for example, by reacting the diamines with 2 moles of diketene to give bis-acetoacetic acid arylides of the general formula

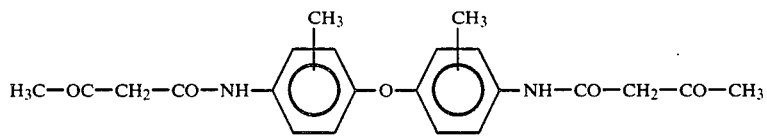

and coupling the product with 2 moles of a suitable diazo component, for example 3-amino-benzoic acid anilide. Red pigment dyestuffs are obtained by coupling monoazo dyestuffs from suitable diazo components and naphthol-AS components by means of the new diamines to give sparingly soluble diazo pigments.

To be able to prepare polyurethanes from the new diamino-alkyldiphenyl ethers, they must first be converted to diisocyanates. This is carried out in the usual manner by means of phosgene in a suitable solvent, such as chlorobenzene (compare W. Siefgen, Ann. 562, 75 et seq. (1949)).

For example, 4,4'-diamino-2,2'-ditolyl ether dissolved in chlorobenzene can be converted by means of phosgene, at temperatures of 120° to 130° C., to 2,2'-ditolyl ether-4,4'-diisocyanate, in good yield. This new diisocyanate is a substance which melts at 42° to 43° C. and boils at 182° to 185° C./2.3 mbar, and which can be converted by means of polyfunctional alcohols, using known methods, to polyurethanes.

The following compounds are particularly suitable as diaminoalkyldiphenyl ethers for the preparation of dyestuffs and polymers: 4,4'-diamino-2-methyl-diphenyl ether, 4,4'-diamino-2,2'-dimethyl-diphenyl ether, 4,4'-diamino-3,3'-dimethyl-diphenyl ether, 2,4'-diamino-4,2'-dimethyl-diphenyl ether, 4,4'-diamino-2,3'-dimethyl-diphenyl ether and 4,4'-diamino-2,6-dimethyl-diphenyl ether.

The diacetyl-alkyldiphenyl ethers and their dioximes, required for the preparation of the diamines according to the invention, are obtained by known methods (compare *Houben-Weyl, Methoden der organischen Chemie,* Volume VIII, 2a, page 15 et seq. and Volume X/4, page 55 et seq.).

The examples which follow describe the conversion of dioxime starting materials to the diacetylaminoalkyldiphenyl ethers and the hydrolysis of the latter to the diamines claimed.

EXAMPLE 1

156 g (0.5 mole) of the dioxime (melting point 183°–184° C.) of 4,4'-diacetyl-2,2'-ditolyl ether were dissolved in 400 ml of trifluoroacetic acid at 20° to 25° C. This solution was added dropwise over 2 hours to 100 ml of boiling trifluoroacetic acid, during which addition the internal temperature steadily rose from 72° to 81° C. The reaction was stirred for a further hour at 80° C. and was then run slowly into 1.5 kg of ice water. The solid rearrangement product was filtered off, washed acid-free and dried. 140 g of 4,4'-diacetylamino-2,2'-ditolyl ether were obtained, melting point 214°–216° C. Recrystallization of a sample from ethanol/water (1:1) increased the melting point to 216°–217° C.

For hydrolysis, the 140 g of diacetylamino compound was suspended in 900 ml of 20% strength hydrochloric acid and the mixture was stirred for 4 to 5 hours at 90° to 95° C. After completion of the reaction, the mixture was rendered alkaline by slow addition of 250 ml of concentrated sodium hydroxide solution and was cooled, whereupon the reaction product solidified; it was filtered off, washed until neutral and dried in vacuo at 40° C. 98 g of 4,4'-diamino-2,2'-ditolyl ether of melting point 103° to 105° C. were obtained. It was possible to recrystallize the compound from ligroin (melting point 104° to 106° C.). As a rule, the non-recrystallized material was adequate for the preparation of dyestuffs and of the diisocyanate.

EXAMPLE 2

187 g (0.6 mole) of the dioxime (melting point 134°–136° C.) of 4,4'-diacetyl-3,3'-ditolyl ether were dissolved in 600 ml of a 1:1 mixture of glacial acetic acid and acetic anhydride, then the solution was heated to 70° C. and a dry stream of hydrogen chloride gas was introduced for 3 hours. The mixture was then cooled to room temperature and deleted slowly with 500 ml of ice water, and the rearrangement product which separated out was thoroughly suction-filtered, washed neutral with water and dried in vacuo at 90° C. 168 g of 4,4'-diacetyl-amino-3,3'-ditolyl ether (melting point 260°–262° C.) were obtained. A sample recrystallized from methylglycol melted at 263° to 264° C.

For hydrolysis, the 168 g of diacetylamino compound was suspended in a solution of 73 g of potassium hydroxide in 250 ml of 80% strength aqueous methanol and the suspension was heated for 2 to 3 hours to 120° C. under pressure. When the mixture had cooled, the reaction product was filtered off under suction, washed neutral with water and dried. This gives 95 g of 4,4'-diamino-3,3'-ditolyl ether (melting point 103° to 108° C.). When recrystallized from toluene, the diamine melted at 108° to 110° C.

It will be understood that the specification and examples are illustrative but not limitative of the present invention and that other embodiments within the spirit and scope of the invention will suggest themselves to those skilled in the art.

What is claimed:

1. A diamino-alkyldiiphenyl ether of the formula

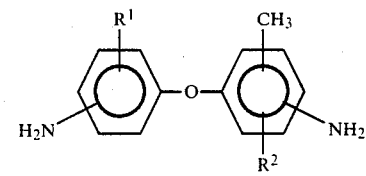

wherein
$R^1$ and $R^2$ are identical or different and denote hydrogen or methyl, but $R^1$ and $R^2$ do not simultaneously represent methyl.

2. A diamino-alkyldiphenyl ether according to claim 1 of the formula

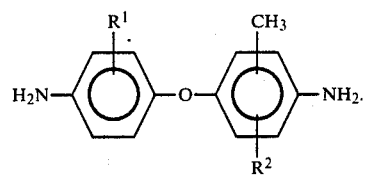

3. A diamino-alkyldiphenyl ether according to claim 1, wherein $R^1$ is methyl and $R^2$ is hydrogen.

4. A process for the preparation of the diamino-alkyldiphenyl ethers of the formula

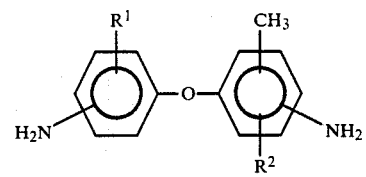

wherein
$R^1$ and $R^2$ are identical or different and denote hydrogen or methyl, but $R^1$ and $R^2$ do not simultaneously represent methyl, comprising acetylating a alkyldiphenyl ether of the formula

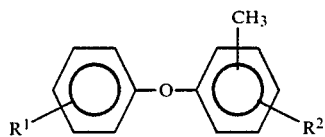

wherein
$R^1$ and $R^2$ have the above-mentioned meanings, converting the diacetyl compounds obtained, in aqueous-alcoholic solution or suspension, to the corresponding dioximes with hydroxylamine, subjecting the dried dioximes to a Beckmann rearrangement and thereafter hydrolyzing the diacetylaminoalkyl-diphenyl ethers formed by means of aqueous mineral acids or alkali metal hydroxide solutions to give the diamines.

5. A process according to claim 4, wherein the acetylation of the alkyldiphenyl ether is carried out with a twofold molar amount of acetyl chloride in an organic solvent in the presence of anhydrous aluminium chloride in a temperature range from 0° to 50° C.

6. A process according to claim 4, wherein said acetylating is conducted in the presence of an organic solvent selected from the group consisting of methylene chloride, dichloroethane, tetrachlorethane and mixtures thereof.

7. A process according to claim 4, wherein the diacetyl compounds, in aqueous methanol and/or ethanol, are reacted with excess hydroxylammonium chloride and/or sulphate at temperatures of 60° to 90° C. and the hydrochloric acid and/or sulphuric acid liberated is bonded by addition of alkali metal hydroxide solutions.

8. A process according to claim 4, wherein the dried dioximes, in concentrated sulphuric acid, are heated to temperatures of 90° to 110° C. or a solution of the dioxime in trifluoroacetic acid is allowed to run into boiling trifluoroacetic acid at temperatures of 70° to 80° C. or hydrogen chloride gas is passed into a solution of the dioxime in mixtures of acetic acid and acetic anhydride at temperatures of 60° to 120° C.

9. A process according to claim 4, wherein the diacetylaminoalkyldiphenyl ethers are hydrolyzed with 20 to 25% strength aqueous hydrochloric acid at temperatures of 80° to 100° C. or with a 20 to 30% strength solution of potassium hydroxide in aqueous methanol under pressure at temperatures of 100° to 140° C.

10. A process according to claim 4, wherein said alkyldiphenyl ethers are selected from the group consisting of 2-methyl-diphenyl ether, 3-methyldiphenyl ether, 2,2'-ditolyl ether, 2,3'-ditolyl ether, 3,3'-ditolyl ether, 2,4'-ditolyl ether, 2,5-dimethyl-diphenyl ether and 2,6-dimethyl-diphenyl ether.

* * * * *